United States Patent
Schisel

(10) Patent No.: US 8,677,978 B2
(45) Date of Patent: Mar. 25, 2014

(54) SYSTEM AND METHOD FOR CARBURETOR VENTING

(75) Inventor: Travis D. Schisel, Cato, WI (US)

(73) Assignee: Kohler Co., Kohler, WI (US)

( * ) Notice: Subject to any disclaimer, the term of this patent is extended or adjusted under 35 U.S.C. 154(b) by 646 days.

(21) Appl. No.: 13/040,004

(22) Filed: Mar. 3, 2011

(65) Prior Publication Data
US 2011/0214645 A1    Sep. 8, 2011

Related U.S. Application Data

(60) Provisional application No. 61/310,216, filed on Mar. 3, 2010.

(51) Int. Cl.
*F02M 33/02*    (2006.01)

(52) U.S. Cl.
USPC .......................................................... 123/518

(58) Field of Classification Search
USPC .................................. 123/516–520
See application file for complete search history.

(56) References Cited

U.S. PATENT DOCUMENTS

| | | | |
|---|---|---|---|
| 3,191,587 A * | 6/1965 | Hall | 123/519 |
| 3,289,711 A | 12/1966 | Hall | |
| RE26,169 E | 3/1967 | Hall | |
| 3,393,669 A | 7/1968 | Vardi et al. | |
| 3,665,906 A * | 5/1972 | De Palma | 123/519 |
| 3,683,597 A | 8/1972 | Beveridge et al. | |
| 4,279,233 A | 7/1981 | Tobita et al. | |
| 4,475,522 A | 10/1984 | Oonaka | |
| 4,849,604 A | 7/1989 | Woolcott | |
| 5,570,672 A | 11/1996 | Kunimitsu et al. | |
| 5,592,922 A | 1/1997 | Denz | |
| 5,623,911 A | 4/1997 | Kiyomiya et al. | |
| 5,630,403 A | 5/1997 | Van Kampen et al. | |

(Continued)

FOREIGN PATENT DOCUMENTS

| | | |
|---|---|---|
| DE | 31 22 883 A1 | 1/1983 |
| EP | 1 548 270 A1 | 6/2005 |
| JP | 2001-152979 A | 6/2001 |
| WO | 2011109634 A1 | 9/2011 |

OTHER PUBLICATIONS

PCT/US2011/027050; Notification of Transmittal of International Search Report and Written Opinion of International Searching Authority; Aug. 8, 2011; 14 pages.

(Continued)

*Primary Examiner* — Hieu T Vo
(74) *Attorney, Agent, or Firm* — Whyte Hirschboeck Dudek S.C.

(57) ABSTRACT

A system for venting vapors from a fuel tank of an engine, an engine with such a system, and related methods are disclosed. In one embodiment, such a system includes a coupling device having first, second, and third ports that are connected at a junction, where the first and second ports are respectively configured to be at least indirectly coupled to the tank and a carburetor, respectively, and where the third port is in communication with an outside environment via a filter. The system further includes an obstruction that is formed at a location downstream of the junction en route toward the carburetor, the location being either within the coupling device or at a position downstream of that device, such that at least some of the vapors can proceed from the tank to the carburetor and at least some air from the environment is able to proceed toward the tank.

20 Claims, 8 Drawing Sheets

(56) References Cited

U.S. PATENT DOCUMENTS

| | | | |
|---|---|---|---|
| 5,635,630 | A | 6/1997 | Dawson et al. |
| 5,769,057 | A | 6/1998 | Hashimoto et al. |
| 5,806,500 | A | 9/1998 | Fargo et al. |
| 5,826,566 | A | 10/1998 | Isobe et al. |
| 5,970,958 | A | 10/1999 | DeLand et al. |
| 6,058,913 | A | 5/2000 | Busato et al. |
| 6,460,516 | B2 | 10/2002 | Kimoto et al. |
| 6,503,301 | B2 | 1/2003 | Uchino et al. |
| 6,540,815 | B1 | 4/2003 | Hiltzik et al. |
| 6,814,061 | B2 | 11/2004 | Everingham |
| RE38,844 | E | 10/2005 | Hiltzik et al. |
| 6,955,159 | B2 | 10/2005 | Ogawa |
| 6,959,696 | B2 | 11/2005 | Shears et al. |
| 7,008,470 | B2 | 3/2006 | Makino et al. |
| 7,011,076 | B1 | 3/2006 | Weldon et al. |
| 7,047,952 | B1 | 5/2006 | Yamauchi et al. |
| 7,159,577 | B2 | 1/2007 | Haskew et al. |
| 7,185,639 | B1 * | 3/2007 | Roche et al. .................. 123/516 |
| 7,267,112 | B2 | 9/2007 | Donahue et al. |
| 7,424,884 | B2 * | 9/2008 | Woody .......................... 123/517 |
| 7,647,920 | B2 | 1/2010 | Amano et al. |
| 8,156,924 | B2 | 4/2012 | Hudak et al. |
| 2002/0036015 | A1 | 3/2002 | Miyajima et al. |
| 2004/0261777 | A1 | 12/2004 | Ogawa |
| 2005/0178368 | A1 | 8/2005 | Donahue et al. |
| 2009/0071123 | A1 | 3/2009 | Tomazic et al. |
| 2009/0277427 | A1 | 11/2009 | Yoshimura |
| 2009/0288645 | A1 | 11/2009 | Childress et al. |
| 2010/0094493 | A1 | 4/2010 | Atsumi |

OTHER PUBLICATIONS

Control of Emissions from Marine SI and Small SI Engines, Vessels, and Equipment—Draft Regulatory Impact Analysis; U.S. Environmental Protection Agency; www.epa.gov/otaq/regs/nonroad/marinesi-equipId/420d07004.pdf; Apr. 2007; 712 pages.

Lawn and Garden (Small Gasoline) Equipment; United States Environmental Protection Agency; http://www.epa.gov/otaq/equip-ld.htm; printed Jul. 14, 2011; 4 pages.

* cited by examiner

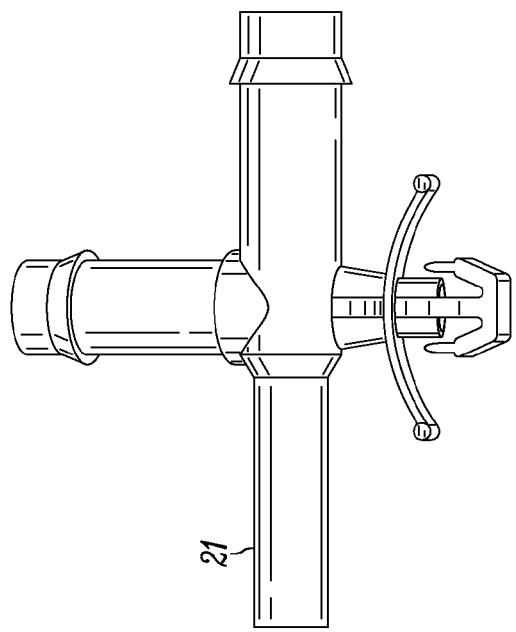
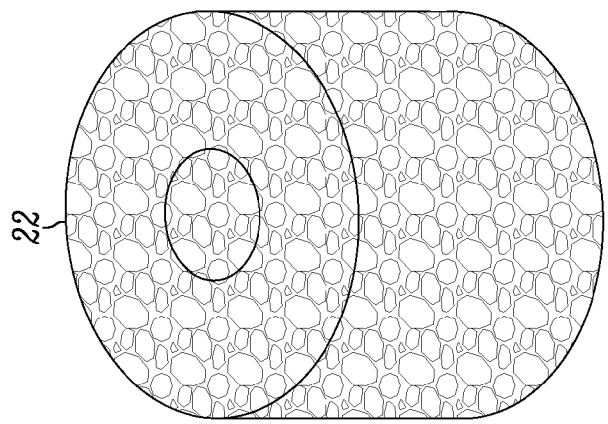
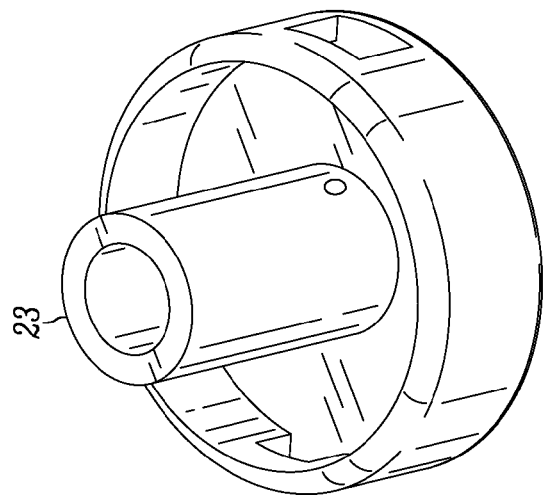
FIG. 3

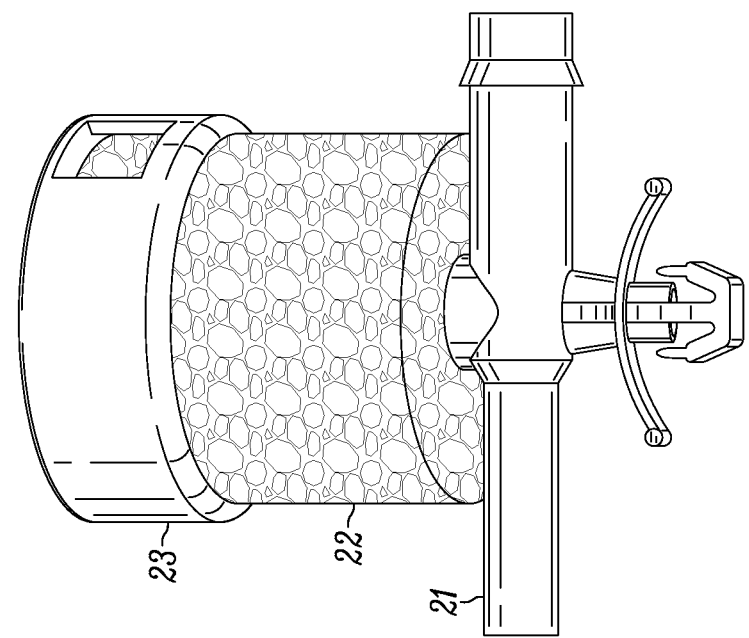

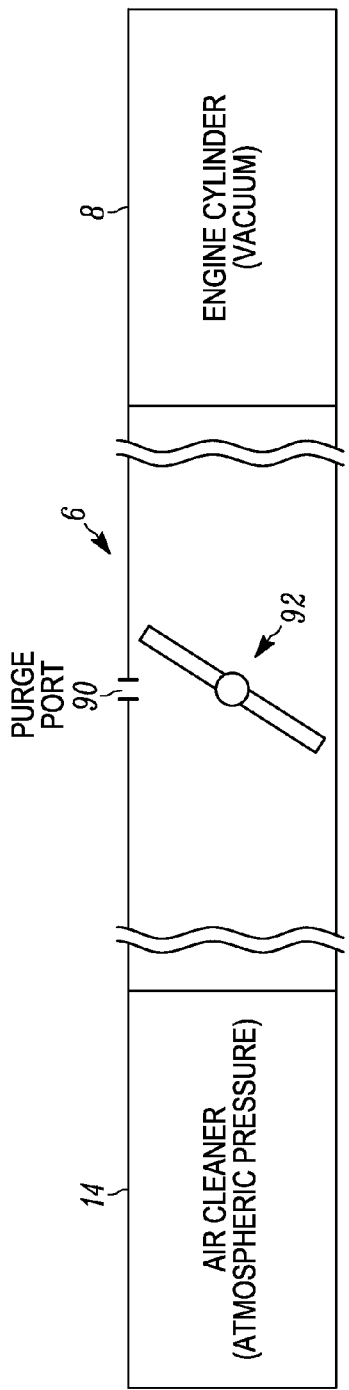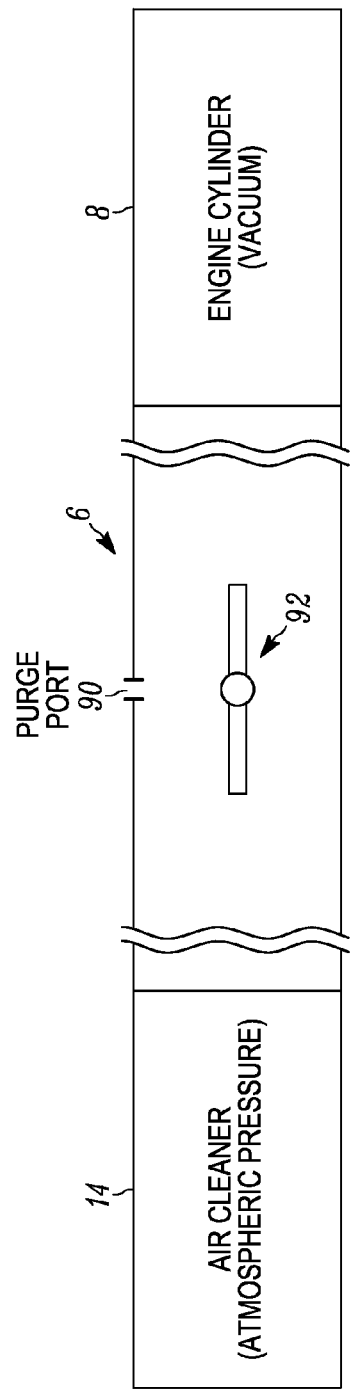

SYSTEM AND METHOD FOR CARBURETOR VENTING

CROSS-REFERENCE TO RELATED APPLICATIONS

The present Application claims the benefit of U.S. provisional patent application No. 61/310,216 filed on Mar. 3, 2010 and entitled "System and Method for Carburetor Venting", which is hereby incorporated by reference herein.

FIELD OF THE INVENTION

The present invention relates to internal combustion engines and, more particularly, to systems and methods employed in internal combustion engines to control, reduce, or otherwise address evaporative emissions.

BACKGROUND OF THE INVENTION

Small internal combustion engines are used in a wide variety of applications including for example, lawn mowers, lawn tractors, snow blowers and power machinery. It is common to find that such internal combustion engines employ a carburetor to provide an appropriate air/fuel mixture (also called "charge") to the combustion chamber of the internal combustion engine. Frequently, the carburetor in such an internal combustion engine is connected via a supply line to a fuel tank that stores fuel such as gasoline, diesel fuel and other types of liquid fuels that are used by the particular engine. Typically, fuel enters the carburetor at least in part due to a pressure differential between the fuel tank and the venturi region of the carburetor. The fuel is mixed with air within the venturi region of the carburetor.

When situated within a fuel tank, certain amounts of a liquid fuel typically become vaporized as hydrocarbons, particularly when the temperature within the tank rises, when the tank experiences high levels of jostling, and/or when the volume within the tank unoccupied by fuel (and filled with air) becomes rather large relative to the overall tank. The vaporization of fuel continues even during the normal course of storage of the fuel within the fuel tank.

Fuel vapors emanating from the fuel tanks of internal combustion engines are a primary contributor to overall evaporative emissions from such engines. Such emissions from fuel tanks can occur particularly when passage(s) are formed that link the interior of the fuel tank with the outside atmosphere, for example, passages that are provided for venting purposes as well as the passage existing between the interior of the fuel tank and the outside atmosphere when refueling occurs. Because fuel vapors can contribute to ozone and urban smog and otherwise negatively impact the environment, increasingly it is desired that these evaporative emissions from fuel tanks be entirely eliminated or at least reduced.

In particular, legislation has recently been enacted (or is in the process of being enacted) in various jurisdictions such as California placing restrictions on the evaporative emissions of Small Off Road Engines (SORE), such as those employed in various small off-road vehicles and other small vehicles that are used to perform various functions in relation to the environment, for example, lawn mowers and snow blowers. Additionally, the EPA is requiring that running losses be controlled on small gasoline engines.

In at least some conventional evaporative emissions control systems, carbon canisters are used to filter/adsorb fuel vapors. Yet carbon canisters are often costly additions to engines and engine applications/customer units.

For at least these reasons, therefore, it would be advantageous if an improved system (or apparatus or device) and/or method could be created to eliminate, prevent, or at least reduce evaporative emissions from fuel tanks, such as the fuel tanks of internal combustion engines including, for example, SORE engines.

BRIEF SUMMARY OF THE INVENTION

The present inventor has recognized that the EPA standard pertaining to the control of running losses on small gasoline engines can (in contrast to some other standards, such as possibly those of the California Air Resources Board (CARB)) be satisfied without the use of a carbon canister. More particularly, while some such other standards require that an engine satisfy a "diurnal test" that takes into account engine emissions over an extended period of time under a variety of circumstances (e.g., both where the engine is running and not running), the EPA standard is not as rigorous and in particular does not mandate that an engine's evaporative emissions be controlled while an engine is not running. In view of this, the present inventor has further recognized that, at least with respect to the EPA standard and possibly other similarly-rigorous standards, it is possible to avoid the use of any carbon canister in providing an evaporative emissions control system. In particular, the present inventor has additionally recognized that in at least some evaporative emission systems, instead of employing a carbon canister, it is possible to use one or more other component(s) to meet evaporative emissions goals such as an appropriate filter component, as discussed in further detail below. The use of such other component(s) can thereby reduce the cost of engine manufacture relative to what the cost would be if a carbon canister was utilized. Further, by appropriately implementing such component(s), it is also possible to achieve evaporative emissions goals without negatively impacting fuel flow from the fuel tank.

In at least one embodiment, the present invention relates to a system for venting fuel vapors from a fuel tank of an internal combustion engine. The system includes a coupling device having first, second and third ports that are all connected with one another internally at a junction within the coupling device, and a filter in communication with the third port, where the first port is configured to be at least indirectly coupled to the fuel tank, where the second port is configured to be at least indirectly coupled to a carburetor, and where the third port is in communication with an outside environment via the filter. The system further includes an obstruction that is formed at a location downstream of the junction en route from the junction toward the carburetor, the location being either within the coupling device or at a position downstream of the coupling device. The coupling device is configured to allow at least some of the fuel vapors to proceed from the fuel tank to the carburetor, and at least some air from the outside environment is able to proceed via the filter into the third port and subsequently toward the fuel tank.

In at least one further embodiment, the present invention relates to an internal combustion engine assembly with a system for venting fuel vapors. The internal combustion engine assembly includes a fuel tank, and a structure that receives incoming air for use by an engine of the internal combustion engine assembly. The internal combustion engine assembly further includes a connector assembly including a filter and a coupling device having first, second and third ports that are all connected with one another internally at a junction within the coupling device, where the first port is in communication with the fuel tank, the second port is in communication with the structure, and third port is in communication with an outside atmosphere indirectly by way of the filter. At least one obstruction is formed within one or both of (a) a first channel within the coupling device linking the junction with the second port and (b) a second channel at least partly linking the second port with the structure, wherein the at least one obstruction partly but not entirely obstructs a flow path through one or both of the first and second channels.

Additionally, in at least one embodiment, the present invention relates to a method of operating an internal combustion engine assembly. The method includes providing a coupling device having first, second, and third ports that are in communication with one another, where the first port is at least indirectly coupled to a fuel tank of the engine assembly, where the second port is at least indirectly coupled to a throttle structure of the engine assembly, and where the third port is in communication with an outside atmosphere by way of a filter. The method further includes, during a first time at which an engine of the engine assembly is not being operated, either (a) allowing a first portion of fuel vapors to proceed from the fuel tank to the outside environment via the coupling device and the filter, or (b) at least partly restricting the first portion of the fuel vapors from proceeding from the fuel tank to the outside environment due to the filter. The method also includes, during a second time at which the engine is being operated, either (c) allowing a second portion of fuel vapors to proceed from the fuel tank to the throttle structure via the coupling device, or (d) allowing at least some air from the outside environment to proceed into the coupling device via the filter and toward the fuel tank, whereby a vacuum within the fuel tank is reduced.

In further embodiments, the present invention relates also to engines or engine assemblies comprising such venting systems, as well as other methods of operating or assembling such engines, engine assemblies, venting systems, or related components (e.g., a method of assembling a T-shaped connector assembly from a T-shaped connector, a filter component, and a cap portion). Embodiments of the present invention can be implemented in connection with a variety of internal combustion engines including, for example, a variety of engines with carburetors as well as other types of engines, such as engines employing electronic fuel injection (EFI). Many other aspects and embodiments are also contemplated and considered within the scope of the invention.

BRIEF DESCRIPTION OF THE DRAWINGS

Embodiments of the invention are disclosed with reference to the accompanying drawings. It should be understood that the embodiments shown in the drawings are provided for illustrative purposes only, and that the present invention is not limited in its application or scope to the details of construction or the arrangements of components particularly illustrated in these drawings.

FIGS. 3-6 respectively are side perspective views of the T-shaped connector assembly of FIG. 1 in various states of disassembly, partial assembly and full assembly;

FIGS. 9A-9B are two schematic illustrations showing in more detail how the carburetor venting system of FIG. 1 is implemented in relation to the carburetor.

DETAILED DESCRIPTION OF THE PREFERRED EMBODIMENTS

Figure 1:
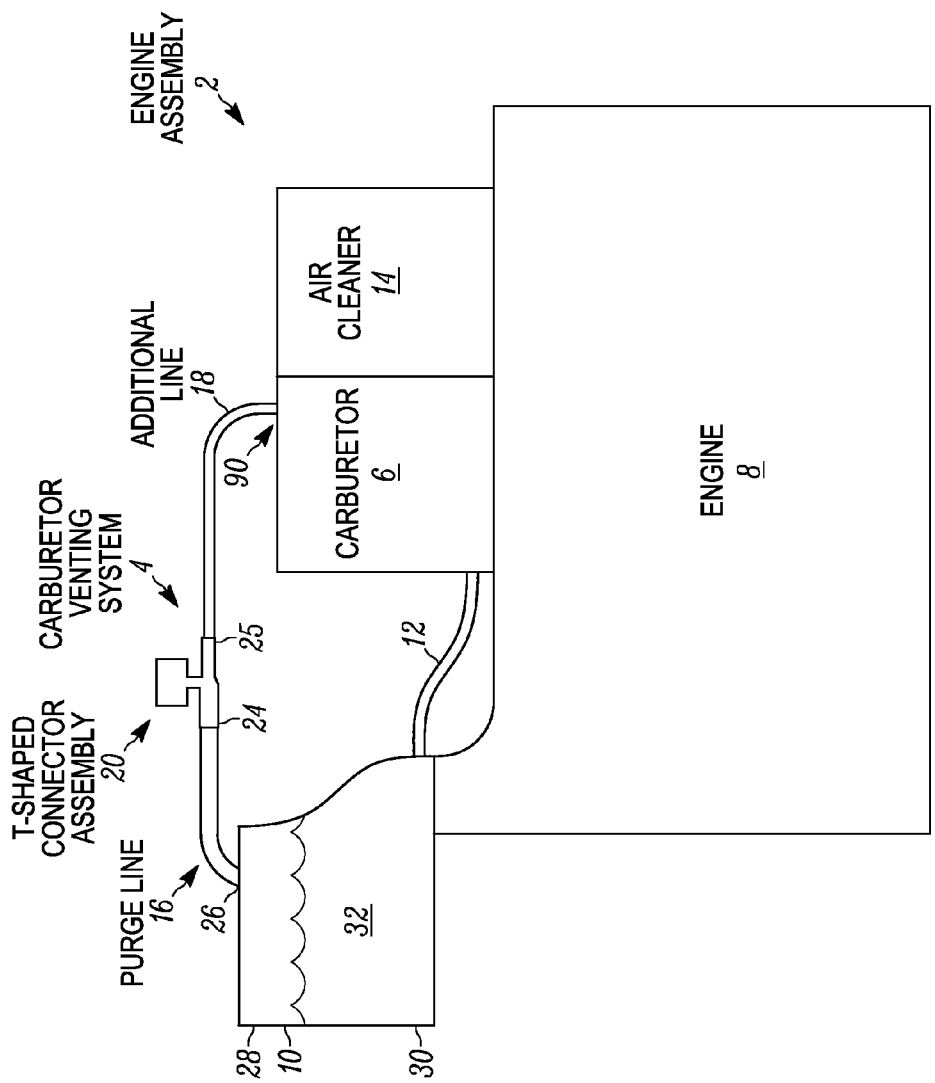
FIG. 1 is a schematic diagram showing an exemplary engine assembly including components of an exemplary evaporative emissions control system or a carburetor venting system, which is shown to have a T-shaped connector assembly in accordance with at least one embodiment of the present invention.

Referring to FIG. 1, a schematic diagram is provided showing components of an engine assembly 2 having an evaporative emissions control system that is hereinafter referred to as a carburetor venting system 4, in accordance with at least one embodiment of the present invention. As shown, the engine assembly 2 includes, in addition to the carburetor venting system 4, a carburetor 6 that is coupled or integrated with an engine 8 that can be understood to include, among other portions, a crankcase and one or more cylinder(s). The engine assembly 2 further includes a fuel tank 10 that is capable of supplying fuel to the carburetor 6 (or more particularly to a carburetor fuel bowl) via a fuel line 12. The carburetor 6 receives incoming air provided from an air cleaner (or air filter) 14 of the engine assembly 2, and serves to mix fuel (as provided via the fuel line) with the incoming air at a venturi region of the carburetor so as to develop charge that can be then provided to the one or more engine cylinder(s) of the engine 8.

As for the carburetor venting system 4, it includes several components connecting the carburetor 6 with the fuel tank 10. More particularly as shown, the carburetor venting system 4 includes a purge line 16, an additional line 18, and a T-shaped connector assembly or T-fitting 20. As shown, the T-shaped connector assembly 20 is coupled between the purge line 16 and the additional line 18. The purge line 16 links a first end 24 of the T-shaped connector assembly 20 to the fuel tank 10 while the additional line 18 links a second end 25 of the T-shaped connector assembly 20 to the carburetor 6. More particularly, the purge line 16 links the T-shaped connector assembly 20 to a vent opening 26 of the fuel tank 10 at an upper region 28 of the fuel tank 10 within which fuel vapors are found. This is in contrast to the fuel line 12, which is connected to a lower region 30 of the fuel tank 10 at which fuel 32 congregates.

Referring still to FIG. 1 and additionally to FIGS. 9A-9B, with respect to the additional line 18, that line links the T-shaped connector assembly 20 to the carburetor 6 and, more particularly, to a purge port 90 at the carburetor positioned proximate a venturi region of the carburetor at which fuel received via the fuel line 12 is mixed with air. As shown particularly in FIGS. 9A-9B, in the present embodiment the purge port 90 is positioned adjacent the location of a throttle valve 92 within the carburetor 6. Further as shown in FIG. 9A, in the present embodiment the purge port 90 is positioned so that, at a time during which the engine is idling, the purge port is slightly upstream of the throttle valve 92, that is, on the side of the throttle valve that is closer to the air cleaner 14 rather than the cylinder(s) of the engine 8. Thus, the pressure experienced at the purge port 90 is more closely that of atmospheric pressure rather than a reduced (vacuum) pressure associated with the engine cylinder(s). By comparison, as illustrated in FIG. 9B, when the throttle valve 92 is fully opened such that the engine is operated at full throttle, the purge port 90 more closely experiences the reduced (vacuum) pressure associated with the engine cylinder(s).

In at least some embodiments, the carburetor venting system 4 is particularly intended to allow the engine assembly 2 to satisfy one or more evaporative emissions standards such as those established by the Environmental Protection Agency (EPA) and described in "Control of Emissions from Marine SI and Small SI Engines, Vessels and Equipment" found at http://www.epa.gov/otaq/regs/nonroad/marinesi-equipld/420d07004.pdf (EPA document EPA420-D-07-004, April 2007), which is hereby incorporated by reference herein (additional information can also be found at http://www.epa.gov/otaq/equip-ld.htm, which is also hereby incorporated by reference herein). Due to the particular requirements of these EPA emissions standards (and/or possibly some other emissions standards), embodiments of carburetor venting systems such as the carburetor venting system 4 can allow an engine (or engine assembly) to satisfy these standards even without the use of any carbon canister, even though a carbon canister might be desirable or necessary for allowing an engine (or engine assembly) to satisfy other more rigorous emission standards (e.g., the CARB standards mentioned above).

Additionally as illustrated in FIG. 1, in the present embodiment, the location from which the fuel 32 is provided from the fuel tank 10 is physically above the location at which the fuel is provided to the carburetor 6 (e.g., the carburetor fuel bowl), such that the fuel proceeds from the fuel tank to the carburetor solely or predominantly due to the force of gravity exerted upon the fuel. That is, the carburetor 6 is "gravity fed" with fuel. That said, as discussed further below, the particular design of the carburetor venting system 4 is particularly suited for allowing desired venting of fuel vapors from the fuel tank 10 (and the upper region 28) without compromising (or without compromising to a significant degree) the ability of the fuel 32 to be fed properly to the carburetor 6 via the fuel line 12, even when the level of the fuel within the fuel tank 10 is low.

The carburetor venting system 4 can be utilized with (or implemented in conjunction with) any of a variety of different internal combustion engines, and the engine 8 can take any of a variety of forms. In at least some embodiments, the engine 8 (or engine assembly 2) can be a SORE engine such as a Class 1 or Class 2 small off-road engine such as that implemented in various machinery and vehicles, including, for example, lawn movers, air compressors, and the like. Indeed, in at least some such embodiments, the present invention is intended to be applicable to "non-road engines" as defined in 40 C.F.R. §90.3, which states in pertinent part as follows: "Non-road engine means ... any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Figure 2:
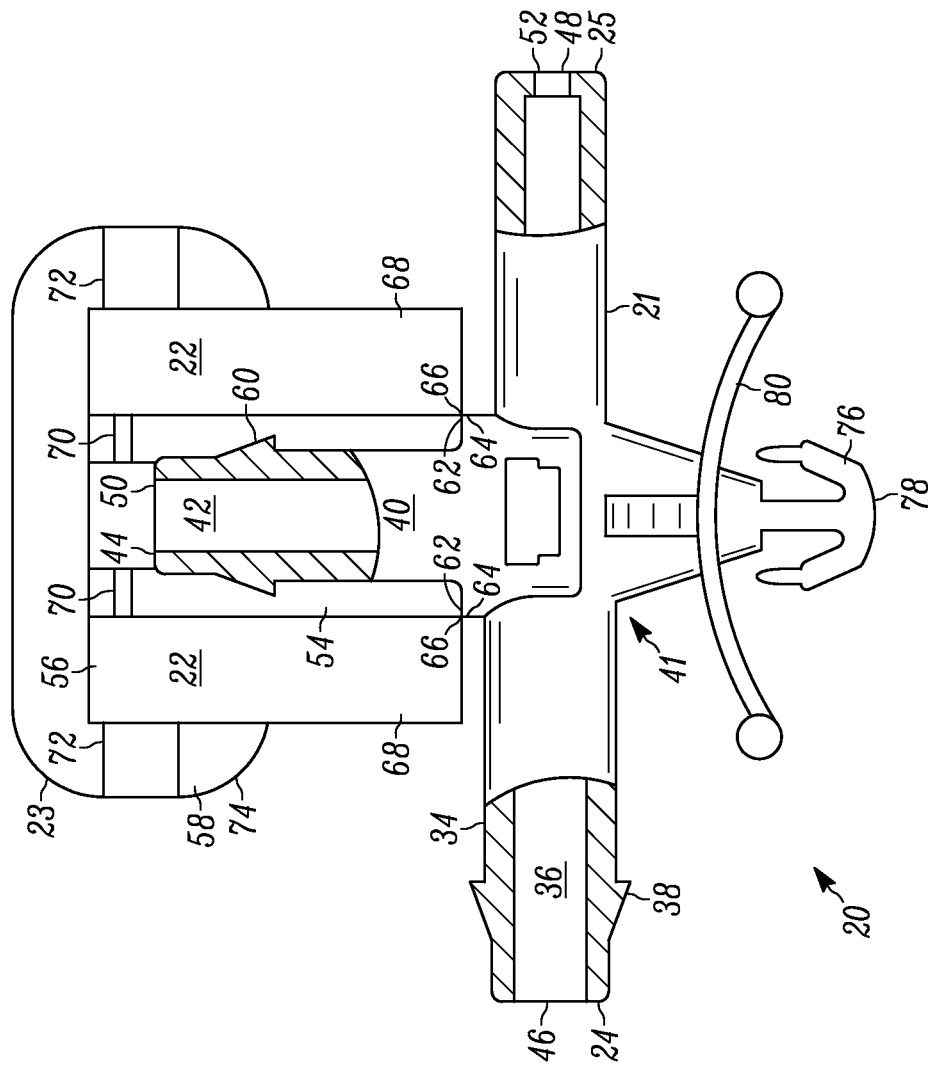
FIG. 2 is a partial cross-sectional view of the T-shaped connector assembly of the carburetor venting system of FIG. 1.

Referring now to FIG. 2, a partial cross-sectional view is provided of the T-shaped connector assembly 20 of FIG. 1, which shows certain features of the T-shaped connector assembly in greater detail (the view of FIG. 2 is a side elevation view corresponding to the schematic view illustrated in FIG. 1, with the cross-sectional portions of the view being taken substantially along a midplane extending through the T-shaped connector assembly). As shown, the T-shaped connector assembly 20 includes a T-shaped connector (or coupling device) 21, a filter component 22, and a cap 23. Additionally as shown, the T-shaped connector 21 includes a first tube portion 34 linking the first end 24 with the second end 25. A primary channel 36 formed within the first tube portion 34 thus extends between the first and second ends 24, 25. Further as shown, the first end 24 in the present embodiment has a diameter that is slightly larger than a diameter of the second end 25 (albeit in other embodiments this need not be the case, that is, the two diameters can be the same or the first end diameter can be smaller than the second end diameter). The first tube portion 34 proximate the first end 24 includes a circumferential locking (e.g., barbed) protuberance 38 by which the first end can be locked into the purge line 16. Although in the present embodiment such a protuberance is not included proximate the second end 25 that is configured to be interconnected with the additional line 18, in alternate embodiments a protuberance can be provided at that end as well. Also, in some other embodiments, multiple (e.g., two, three or more such protuberances) can be provided in series proximate one or both of the first and second ends 24, 25, and/or other formations can be provided that allow for securing of the purge line 16 and/or additional line 18 to the T-shaped connector 21.

In addition to the first tube portion 34 with the primary channel 36, the T-shaped connector 21 additionally includes a second tube portion 40 that extends outward in a perpendicular (or substantially perpendicular) manner away from a mid region 41 of the first tube portion (which is between the first and second ends 24, 25), such that the first and second tube portions effectively form a "T-shape". A secondary channel 42 formed within the second tube portion 40 extends from a third end 44 of the T-shaped connector 21 at the end of the second tube portion 40 up to a junction with the primary channel 36, such that the primary and secondary channels are in communication with one another internally within the T-shaped connector 21. It will be noted from FIG. 2 that the particular partial cross-sectional view of the T-shaped connector 21 provided in FIG. 2 shows the T-shaped connector in such a manner that the primary and secondary channels 36, 42 are revealed proximate the first, second, and third ends 24, 25, and 44 even though those channels are not revealed inward of those ends. By virtue of the primary and secondary channels 36, 42, first, second and third ports 46, 48 and 50 are respectively provided at the first, second, and third ends 24, 25 and 44 of the T-shaped connector 21, respectively, and all three of the ports are in communication with one another.

As already noted, in the present embodiment, the first tube portion 34 has a diameter that is larger at the first end 24 than at the second end 25 (albeit as already noted, in other embodiments, this need not be the case). Likewise, the primary channel 36 formed therewithin has a diameter that is larger proximate the first end 24 than proximate the second end 25. Further, in the present embodiment, at the second end 25 the diameter of the primary channel 36 is particularly reduced so as to form an orifice 52 at the second end that in particular is what forms the second port 48. The orifice 52 serves to limit the rate at which vapors can flow from the T-shaped connector 21 into the additional line 18 for receipt by the carburetor 6 (e.g., to no more than a maximum level). The reduced-diameter portion of the primary channel 36 forming the orifice 52 can also be considered an obstruction. Although the orifice 52 is circular in cross-sectional shape and coaxial with respect to the remainder of the primary channel 36, in alternate embodiments the orifice need not be circular in shape or coaxial with the primary channel but rather can take a variety of other shapes or forms. In each such embodiment, however, the orifice will nevertheless be smaller in cross-sectional area than the primary channel upstream of that orifice (that is, the cross-sectional area of the primary channel in between the orifice and the mid region 41 of the T-shaped connector).

As mentioned, the T-shaped connector assembly 20 additionally includes the filter component 22 and the cap 23, which are supported upon the T-shaped connector 21 when the T-shaped connector assembly is fully-assembled. In the present embodiment, the filter component 22 is an annular structure, while the cap 23 is a mushroom-shaped structure. When the T-shaped connector assembly 20 is fully assembled as shown in FIG. 2, the filter component 22 more particularly is positioned around a tubular stem portion 54 of the cap 23 such that an upper portion 56 of the filter component extends into and is surrounded by a cap portion 58 of the cap 23. The tubular stem portion 54 in turn is positioned onto and over the second tube portion 40 of the T-shaped connector 21, such that the second tube portion extends coaxially within the tubular stem portion almost the entire length of the tubular stem portion up to where the tubular stem portion meets the cap portion 58 of the cap 23. Although not necessary in all embodiments, in the present embodiment the second tube portion 40 proximate the third end 44 also includes a circumferential locking (e.g., barbed) protuberance 60 that allows the tubular stem portion 54 of the cap 23 to lock onto the second tube portion. In still other embodiments, multiple such protuberances or other formations can also or instead be provided proximate the third end.

Further as shown, when the T-shaped connector assembly 20 is fully assembled, an end 62 of the tubular stem portion 54 extends up to an annular ridge 64 extending radially outward slightly beyond the outer diameter of the remainder of the second tube portion 40 proximate the junction of the second tube portion with the first tube portion 34 (the annular ridge itself also being a part of the second tube portion). In this manner, the cap 23 rests upon, and is supported by, the T-shaped connector 21. Likewise a lower edge (particularly, a lower inner annular edge) 66 of a lower portion 68 of the filter component 22 also is supported upon the annular ridge 64. Thus, due to the contact between the filter component 22 and the cap 23, as well as due to the direct contact between the filter component and the annular ridge 64, the filter component also is supported upon the T-shaped connector 21.

With respect to the cap 23 in particular, it should also be noted that in the present embodiment two orifices 70 are provided that extend radially through the tubular stem portion 54 proximate where the tubular stem portion engages the cap portion 58. Also, two additional orifices 72 are further provided extending radially through an annular lip 74 of the cap portion 58, where the two additional orifices 72 respectively are aligned with the respective orifices 70 and facilitate boring of the respective orifices 70. As discussed further with respect to FIG. 8, the orifices 70 allow for air/vapor flow between the interior of the tubular stem portion 54, which is in communication with the third port 50, and the exterior of the tubular stem portion that is in contact with the filter component 22, and vice-versa. By virtue of the orifices 70, therefore, the third port 50 is in communication with the outside environment by way of the filter component 22.

Finally, with respect to the present embodiment of the T-shaped connector assembly 20, it should also be noted that a fastening (or support) structure 76 is also integrally formed upon the T-shaped connector 21 so as to extend away from the mid region 41 substantially perpendicularly away from the first tube portion 34 in a manner diametrically opposed to the direction of the second tube portion 40. In the present embodiment, the fastening structure can be referred to as a "rosebud feature" and includes an anchor-shaped portion 78 (having a flat arrow-like shape) and an arched member 80. Although not shown to be the case in FIG. 1, it will be understood that the fastening structure 76 can allow the T-shaped connector assembly 20 to be affixed to one or more portions of the engine 8 or the engine assembly 2 (even in some embodiments to one or more of the purge line 16 or the additional line 18). For example, the anchor-shaped portion 78 can be slipped through a complementary orifice formed within a portion of sheet metal of the engine 8 such that, ultimately, the sheet metal is held in between tips of the anchor-shaped portion and the arched member 80, which respectively engage opposite sides of the sheet metal portion.

Figure 5:
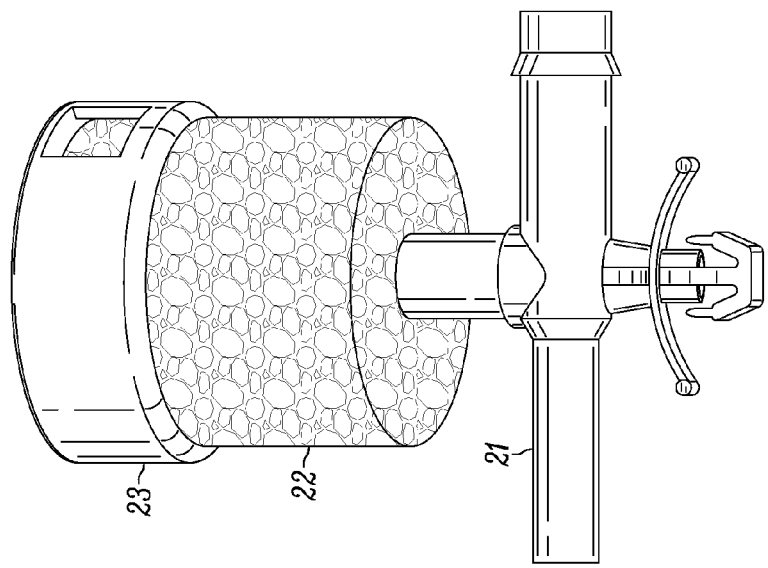
Figure 4:
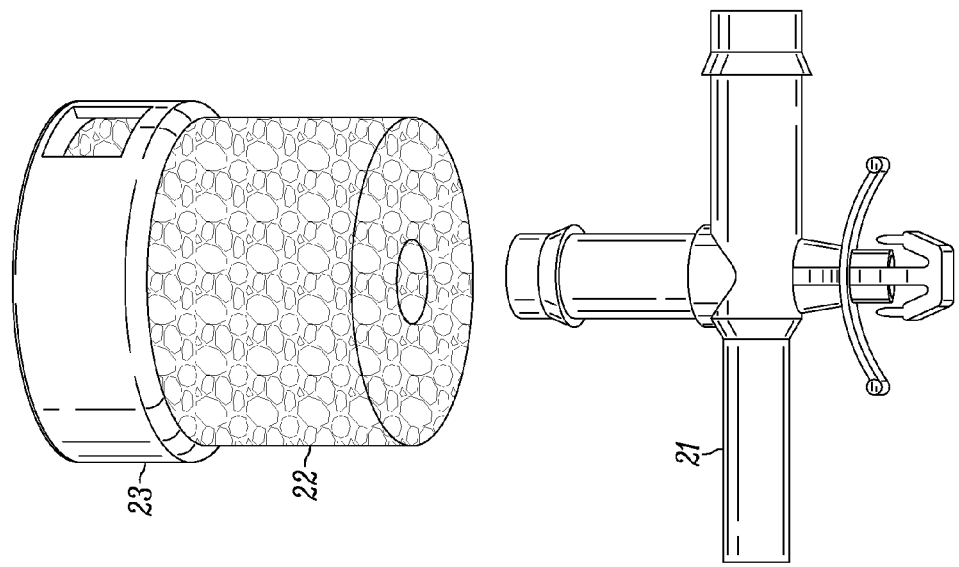

Referring additionally to FIGS. 3-6, additional side perspective views are provided showing the T-shaped connector assembly 20 in various states of assembly and disassembly. FIG. 3 particularly shows the T-shaped connector 21, filter component 22 and cap 23 to be disassembled from one another. By comparison, FIGS. 4 and 5 show the T-shaped connector assembly 20 in varying degrees of assembly, with FIG. 4 showing the cap 23 and filter component 22 to be assembled with one another yet disassembled from the T-shaped connector 21, and FIG. 5 showing the cap 23 and filter component 22 to be assembled and partly situated onto the T-shaped connector 21. FIG. 6, finally, shows the T-shaped connector 21, filter component 22 and cap 23 to be fully-assembled so as to form the overall T-shaped connector assembly 20.

Figure 7:
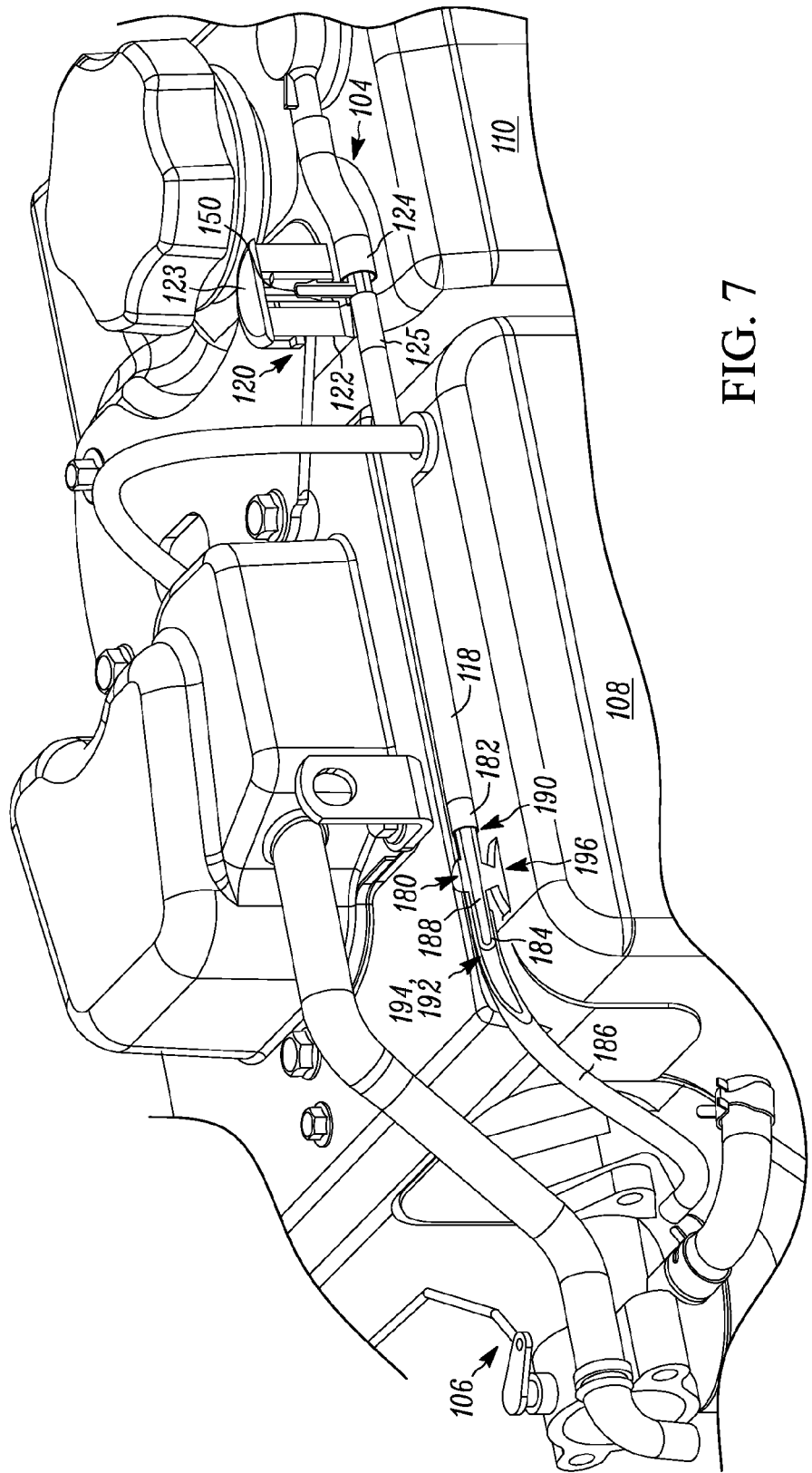
FIG. 7 is a perspective, cut-away view of an alternate embodiment of an engine having an alternate version of a carburetor venting system including both an alternate T-shaped connector assembly and a distinct orifice component, in accordance with another embodiment of the present invention differing from that of FIG. 1.

Turning to FIG. 7, a perspective, cut-away view of an alternate embodiment of an engine assembly 102 having an alternate version of a carburetor venting system 104 is provided. As with the engine assembly 2 of FIG. 1, the engine assembly 102 includes a carburetor 106, an engine 108, and a fuel tank 110. Although not shown, it should be understood that the fuel tank 110 is coupled to the carburetor 106 by way of a fuel line, and an air cleaner is employed upstream of the carburetor 106 so as to provide filtered air to the carburetor. Further as shown in FIG. 7, an alternate embodiment of a T-shaped connector assembly 120 (shown in cross-section) is provided having a first end 124 coupled to a vent opening 126 of the fuel tank 110 by way of a purge line 116 and a second end 125 coupled to an additional line 118. The T-shaped connector assembly 120 is identical to the T-shaped connector assembly 20 in all respects, and includes all features of the T-shaped connector assembly discussed above (including, for example, a filter component 122 and cap 123), except insofar as a first tube portion 134 of the T-shaped connector assembly 120 lacks a reduced-diameter portion forming an orifice at the second end 125 that would correspond to the reduced-diameter portion of the first tube portion 34 forming the orifice 52 at the second end 25 of the T-shaped connector assembly 20. Instead, at the port existing at the second end 125, the diameter of the first tube portion 134 is no smaller than the diameter of the first tube portion farther inward of that port.

Although the carburetor venting system 104 of FIG. 7 lacks an orifice at the T-shaped connector assembly 120 corresponding to the orifice 52 of the T-shaped connector assembly 20, an appropriate orifice for restricting vapor flow toward the carburetor 106 is nevertheless still provided in that carburetor venting system by way of an independent orifice connector 180. As shown, the independent orifice connector 180 is a tubular structure having a first end 182 that is coupled to the additional line 118 (such that the additional line 118 is coupled specifically between the orifice connector and the T-shaped connector assembly 120), as well as a second end 184 that is coupled to a further line 186 that links that second end to the carburetor 106. Portions of the orifice connector 180 (as well as the further line 186) are shown in FIG. 7 in cross-section so as to reveal an internal channel 188 within the orifice connector that links a first port 190 at the first end 182 with a second port 192 at the second end 184. Similar to the second end 25 of the T-shaped connector assembly 20 with the second port 48 having the orifice 52, the second port 192 of the orifice connector 180 has an orifice 194 formed due to a reduction in the diameter of the internal channel 188 relative to its diameter along the rest of the orifice connector 180. By virtue of the orifice 194, vapor flow toward the carburetor 106 is restricted in the same manner as if there had been an orifice at the second end 125 of the T-shaped connector assembly 120.

The orifice connector 180 can take a variety of particular forms depending upon the embodiment. In some embodiments, a Model 25 155 40 orifice connector available from the Kohler Company of Kohler, Wis., can be employed. Although not completely visible, FIG. 7 also shows the orifice connector 180 to include a fastening (or support) structure 196 by which the orifice connector is attached to the engine 108. The fastening structure 196 can take the form of a rosebud feature as discussed above in at least some embodiments. Notwithstanding this description pertaining to FIG. 7, it will be understood that the arrangement shown in FIGS. 1-2 in which the orifice 52 is integrated as part of the T-shaped connector assembly 20 is often advantageous relative to the arrangement of FIG. 7 due to the lesser number of component parts that are required to implement the carburetor venting system by comparison with a system in which there is a separate orifice connector such as the orifice connector 180.

In a further alternate embodiment a T-shaped connector assembly having similar (but not exactly identical) features to the T-shaped connector assemblies 20, 120 can be provided by employing component parts available from Miniature Precision Components, Inc. of Walworth, Wis., namely, a component part number CS3286 as a T-shaped connector (in place of the T-shaped connector 21 or 121), and a component part number A2693 serving as a filter component and cap collectively (in place of the filter component 22 or 122 and cap 23 or 123). A T-shaped connector assembly utilizing such component parts would differ from the T-shaped connector assemblies 20, 120 particularly in that a fastening structure corresponding to the fastening structure 76 and an annular ridge corresponding to the annular ridge 64 would be missing. Also, like the T-shaped connector assembly 120 (but not the T-shaped connector assembly 20) such a T-shaped connector assembly utilizing such component parts would lack an obstruction at its end corresponding to the second ends 25, 125 so as to form an orifice such as the orifice 52 (thus, an independent orifice connector can be used with such an embodiment).

Figure 8:
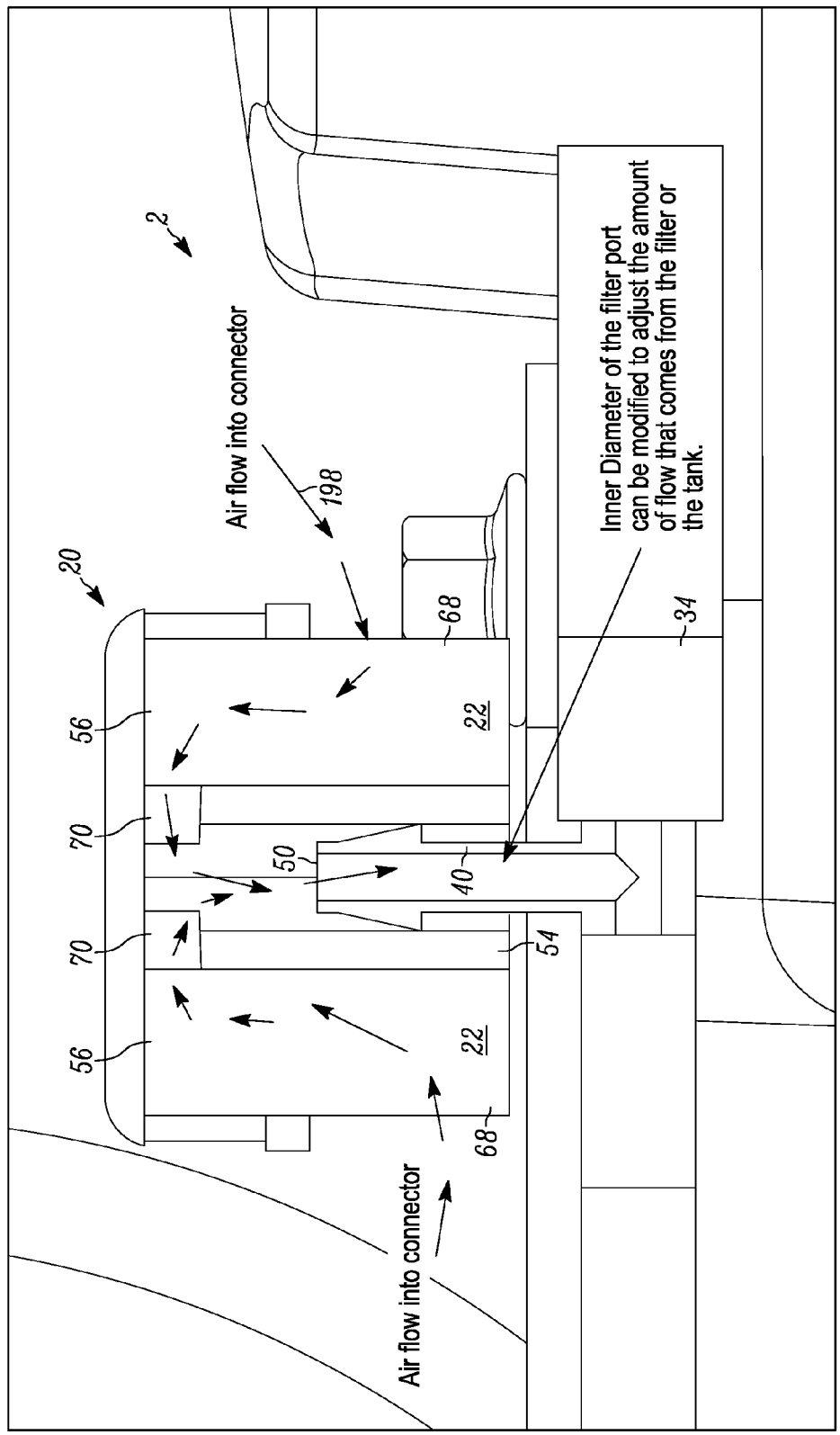
FIG. 8 is a cross-sectional view of the T-shaped connector assembly of FIG. 1 and further illustrating air flow into the carburetor venting system via the T-shaped connector assembly.

Turning next to FIG. 8, an additional cross-sectional view is provided showing portions of an engine assembly such as the engine assembly 2 to particularly illustrate an exemplary manner of air flow into the T-shaped connector assembly 20. In particular as illustrated by arrows 198, air can flow into the T-shaped connector assembly 20 first by flowing into the lower portion 68 of the filter component 22. Upon entering in this manner, the air then passes through the filter component 22 towards the upper portion 56, such that the air is filtered. Subsequently, the air exits the upper portion 56 of the filter component 22 by passing into the annular interior of the filter component and through the orifices 70 of the tubular stem portion 54. Upon passing through the orifices 70, the air then enters the third port 50 of the second tube portion 40 and ultimately into the first tube portion 34 of the T-shaped connector assembly 20. Thus, the air can then potentially proceed toward either the fuel tank or the carburetor.

It should be understood that the exact same manner of air flow as shown in FIG. 8 can be experienced by the T-shaped connector assembly 120 of FIG. 7. Further, it should be understood that an exemplary path of vapor outflow from either of the T-shaped connector assemblies 20, 120 can occur in a manner exactly opposite the directions illustrated by the arrows 198 of FIG. 8. Also as indicated in FIG. 8, the diameter of the secondary channel 42 of the second tube portion 40 can be varied depending upon the embodiment to adjust the flow rate into and/or out of the T-shaped connector assembly 120 (or to adjust the amount of flow that comes from the filter or the tank).

The materials used to construct the various components discussed above, and particularly the T-shaped connector assemblies 20, 120 and/or orifice connector devices discussed above, can take a variety of forms. In at least some embodiments, the T-shaped connectors such as the T-shaped connectors 21, 121 and/or the orifice connectors such as the orifice connector 180 can be made of molded plastic although other flexible or rigid materials or potentially even metals can be used. The caps employed by the T-shaped connector assemblies 20, 120 such as the caps 23, 123 can be made of rubber or plastic or other flexible or semi-flexible (or possibly rigid) materials. The filter components such as the filter components 22, 122 can be made of any of a variety of filtering media such as pleated paper, foam, materials with tiny pores/holes, or other materials. Typically all connections between lines such as the purge lines 16, 116, the additional lines 18, 118, and/or the further line 186 and other components to which those lines are attached should be tightly sealed to prevent the escape of fuel vapors at any of these sealing locations.

By virtue of the carburetor venting systems 4, 104, the engine assemblies 2, 102 discussed above are able to achieve enhanced evaporative emissions performance without the use of any carbon canister(s). Such enhanced performance in at least some embodiments is sufficient for meeting one or more environmental standards such as one or more the EPA standards discussed above. More particularly, when the respective engines 8, 108 of the respective engine assemblies 2, 102 are not operational, fuel vapors from the respective fuel tanks 10, 110 are able to pass from the respective fuel tanks to the respective T-shaped connector assemblies 20, 120 up to the respective filter components 22, 122. In some circumstances, for example when due to temperature changes (e.g., temperature increases) the pressure of fuel vapors within the respective fuel tanks 10, 110 increases, some or all of those vapors are able to pass out of the respective carburetor venting systems 4, 104 by way of the respective filter components 22, 122. Nevertheless, during other circumstances when the respective engines 8, 108 are non-operational but the pressure of fuel vapors within the respective fuel tanks 10, 100 is not excessive, due to the presence of the respective filter components 122, 122, such fuel vapors are somewhat or largely (or possibly entirely) prevented from exiting the respective carburetor venting systems 4, 104 to the outside environment.

Further, during engine operation, fuel vapors from the respective fuel tanks 10, 110 are able to proceed to the respective carburetors 6, 106 of the respective engine assemblies 2, 102 by way of the respective purge lines 16, 116, the respective additional lines 18, 118 and, in the case of the embodiment of FIG. 7, the orifice connector 180 and the further line 186. The fuel vapors proceed in this manner due to the partial vacuum created at the respective venturi regions of the respective carburetors 6, 106, such that the fuel vapors are vented away from the respective fuel tanks 10, 110 to the respective engines 8, 108 for combustion. Additionally during such operation, thanks to the presence of the respective T-shaped connector assemblies 20, 120 with their respective third ports 50, 150 linked to the outside environment via the respective filter components 22, 122, the presence of such a partial vacuum does not negatively affect the flow of fuel out of the respective fuel tanks 10, 110. Rather, at such times, and particularly at times when the partial vacuum might become excessively large relative to the level of fuel within the respective fuel tanks 10, 110, outside air is able to enter the respective carburetor venting systems 4, 104 via the respective filter components 22, 122 and the respective T-shaped connectors 21, 121 and thus proceed to or toward the respective fuel tanks, thus ameliorating (or possibly entirely eliminating) the excessive vacuum.

Additionally, because of the respective orifices 52, 194 formed either at the T-shaped connector assembly 20 or at the orifice connector 180, fuel vapor flow toward the respective carburetors 6, 106 is not excessively large so as to overwhelm the respective carburetors, and no adjustments to carburetor settings or carburetor calibrations need be made depending upon engine operational conditions or for other reasons. This is true even though the orifices 52, 194 remain open at all times, and do not employ any valves or valve-like mechanisms that might be opened or closed. That said, where particular operational conditions arise or are expected, or when engine characteristics vary (e.g., when different fuel tank sizes are being accommodated), the sizes of the orifices 52, 194 can be adjusted by replacing the orifice connector 180 and/or the T-shaped connector 21 of the connector assembly 20 with alternate components providing different-sized orifices. By virtue of varying the orifice sizes in such a manner, desired purge flow rates can be achieved.

Additional information regarding variation of orifice size to achieve different objectives, as well as other features of carburetor venting systems, is provided in pending U.S. patent application Ser. No. 12/251,588 filed Oct. 15, 2008 entitled "Systems and Methods for Regulating Purge Flow Rate in an Internal Combustion Engine", which is hereby incorporated by reference herein.

Further it should be noted that, in the present embodiments, to operate correctly and within regulatory compliance, the respective carburetor venting systems 4, 104 are intended to only allow fuel vapors to exit the carburetor venting systems to the outside atmosphere at times when the respective engines 8, 108 are not running. That is, in the present embodiments, the respective carburetor venting systems 4, 104 are designed to operate such that fuel vapors do not escape out of the respective third ports of the respective T-shaped connectors 21 to the outside atmosphere via the respective filter components 22, 122 except when the respective engines 8, 108 are not operating, while during engine operation fuel vapors are either retained inside the carburetor venting systems 4, 104 and respective fuel tanks 10, 110 or directed to the respective cylinders of the respective engines.

Notwithstanding the above description regarding engine assemblies having carburetors, in other embodiments, embodiments of the present invention are contemplated for use with Electronic Fuel Injection (EFI) systems, in which the purged fuel vapors pass through an EFI throttle body of the engine. In such embodiments, despite the absence of carburetors, purged fuel vapors are still communicated to a purge port at a throttle body upstream of the engine cylinder(s) and downstream of the air cleaner (e.g., in the manner shown in FIGS. 9A-9B). In such embodiments components similar or identical to those discussed above as being part of the carburetor venting systems 4, 104 can still be present, albeit in such embodiments the venting systems are not appropriately referred to as carburetor venting systems but rather can simply be referred to as evaporative emissions systems.

Further, the present invention is intended to encompass a variety of other arrangements of carburetor venting systems or other evaporative emissions systems in addition to those specifically described above. For example, while the above-embodiments employ T-shaped connectors/connector assemblies, in other embodiments connectors/connector assemblies having other shapes can be employed, including other connectors/connector assemblies having three (or possibly more) ports that are not arranged in the shape of a T but rather are arranged in another manner (e.g., a "Y-shape", or some other shape consistent with having three or possibly more output ports).

Further, while the above embodiments employ T-shaped connectors/connector assemblies that are coupled in between the fuel tanks and carburetors by way of two or more lines, the T-shaped connectors/connector assemblies can be positioned at any arbitrary location(s) in between the fuel tanks and carburetors. For example, in some alternate embodiments, the T-shaped connectors/connector assemblies are directly attached to the fuel tanks/fuel tank vents, or directly attached to the carburetors. In some such embodiments, one end of the T-shaped connector/connector assembly can be directly coupled to one of the carburetor or the fuel tank while a different end of the T-shaped connector/connector assembly can be coupled indirectly (e.g., by way of an additional line or lines) to the other of the fuel tank or carburetor. Also, in other embodiments, other devices or mechanisms can be used instead of or in addition to the rosebud-type fastening devices described above to allow for securing/fastening of the T-shaped connector assemblies (or other assemblies) to one or more other components of an engine assembly.

While the orifices 52, 194 discussed above are provided at the second port of the T-connector 20/orifice connector 180, it will be understood that depending upon the embodiment such an orifice can serve the same purpose regardless of its location so long as the orifice is provided at any location downstream of the junction at which the three branches of the T-connector (or other three-port connector) meet, up to the carburetor (or other fuel vapor recipient) itself, en route from that junction to the carburetor. Further, while in the above-described embodiments a single orifice is provided, in other embodiments multiple orifices are provided, including possible multiple orifices that are arranged serially or in parallel with one another. Also, in some alternate embodiments, an orifice can be formed between the atmospheric port of the T-connector (e.g., the third port 50 and the internal junction within the T-connector at which all three ports of the connector link up. Such an orifice can be provided instead of, or possibly even in addition to, the orifice(s) discussed above located between the internal junction and the carburetor (or other fuel vapor recipient).

Additionally, the particular arrangement and/or shape of the filter component and other component(s) of the respective T-shaped connector assemblies (or connector assemblies having different shapes) can take different forms depending upon the embodiment, as can the orifice connector where one is employed in addition to or separate from such connector assemblies. Further, notwithstanding the above description, embodiments of the present invention can also include one or more other component parts. For example, while in the above-described embodiments of FIGS. 1-2 and 7 the orifices 52, 194 serve to regulate vapor flow toward the carburetor, in other embodiments other devices or methods can be used for this purpose (e.g., a check valve, pressure relief valve, or other valve/regulator device). Also for example, in some embodiments, one or more of such other devices and/or other additional components are provided and serve other purposes other than being used to limit the flow of fuel vapors and/or air within the carburetor venting system (or other evaporative emission system). Further for example, in some embodiments, one or more roll-over valve(s) can be provided to prevent liquid fuel within the fuel tank from flowing into the carburetor venting system.

Further, while the above description envisions carburetor venting systems (or other evaporative emissions systems) that do not employ any carbon canisters, in at least some alternate embodiments the carburetor venting systems (or other evaporative emissions systems) of the present invention are specifically intended to allow for substitution of the T-shaped connector assembly with a given type of carbon canister, multiple different types of carbon canisters (e.g., small, mid-sized, or large carbon canisters), or multiple types of evaporative emissions control devices, or vice-versa, or intended to allow for substitution of a portion of the T-shaped connector assembly such as the filter component with a carbon canister (for example, a carbon canister could be coupled to the third port of the T-shaped connector that it is otherwise in communication with the filter component). Again with such embodiments, the carburetor venting systems (or other evaporative emissions systems) are intended to operate in such a manner that fuel vapors do not escape to the outside atmosphere while the engine is running (but again are retained within those systems or the fuel tank or otherwise directed to the engine cylinders). During times when the engine is not operating, fuel vapors from the fuel tank can proceed to the carbon canister (e.g., via a T-shaped connector having a third port that is in communication with that carbon canister) where those fuel vapors are filtered/adsorbed.

Assuming a design allowing for such interchangeability of carburetor venting system (or other evaporative emissions system) components, a given engine assembly design can be appropriately configured for use in any of a variety of different locations/jurisdictions where different environmental standards are in force. For example, in one location an engine assembly can employ a large (more costly) carbon canister, while in another location that same engine assembly can employ a small (less costly) carbon canister, while in yet another location that same engine assembly can employ a T-shaped connector assembly as discussed above (the least costly option). Also, in some additional embodiments, multiple devices such as filter(s) and carbon canister(s) can be used in combination.

Further, while the above-described embodiments of connector assemblies envision the use of a filter component such as the components 22, 122, in some alternate embodiments filters need not be present but instead the atmospheric ports such as the third port 50 can be directly coupled to the outside environment. Also, while in the above-described embodiments it is intended that fuel vapors only proceed to the outside environment when the engine is not operating (and that fuel vapors not be allowed to proceed to the outside environment while the engine is operating), in some alternate embodiments at least some fuel vapors can proceed to the outside environment during engine operation or during particular manner(s) of engine operation.

Also, in some alternate embodiments, a hose can connect a filter device to a fuel tank vapor collection line in another way.

The filter components shown and described above, although convenient for packaging and assembly, are nonetheless merely some among many different possible configurations. Additionally, while the embodiments discussed above envision that the fuel tank itself is sealed such that there are no other pathways into or out of the fuel tank aside from the vent openings (e.g., the vent openings 26, 126) by which the fuel tank is coupled to the carburetor venting system (or other evaporative emission system), the outlet for fuel to proceed to the carburetor (or other fuel recipient such as an EFI system), and the fuel tank cap itself (which is normally sealed closed), in other embodiments there can be one or more other pathways into or out of the fuel tank including, for example, a one-way valve allowing for air to proceed from the outside environment into the fuel tank but not allowing air/vapors to exit to the outside environment.

It should further be noted that it is contemplated that at least some embodiments of the present invention are applicable to engines that have less than one liter in displacement, or engines that both have less than one liter in displacement and fit within the guidelines specified by the above-mentioned regulations. In still further embodiments, the present invention is intended to encompass other small engines, large spark ignition (LSI) engines, and/or other larger (mid-size or even large) engines. In additional embodiments, the present invention is intended to be used with containers or storage tanks other than fuel tanks holding volatile fluids, which are producers of volatile organic compounds (VOC) or evaporative emissions.

It is specifically intended that the present invention not be limited to the embodiments and illustrations contained herein, but include modified forms of those embodiments including portions of the embodiments and combinations of elements of different embodiments as come within the scope of the following claims.

I claim:

1. A system for venting fuel vapors from a fuel tank of an internal combustion engine, the system comprising:
   a coupling device having first, second and third ports that are all connected with one another internally at a junction within the coupling device,
   a filter in communication with the third port, wherein the first port is configured to be at least indirectly coupled to the fuel tank, wherein the second port is configured to be at least indirectly coupled to a carburetor, and wherein the third port is in communication with an outside environment via the filter; and
   an obstruction that is formed at a location downstream of the junction en route from the junction toward the carburetor, the location being either within the coupling device or at a position downstream of the coupling device,
   wherein the coupling device is configured to allow at least some of the fuel vapors to proceed from the fuel tank to the carburetor and wherein at least some air from the outside environment is able to proceed via the filter into the third port and subsequently toward the fuel tank.

2. The system of claim 1, wherein the obstruction forms an orifice proximate the second port.

3. The system of claim 1, wherein the obstruction is formed in a component distinct from and connected at least indirectly to the coupling device, downstream of the second port en route toward the carburetor.

4. The system of claim 1, wherein the filter is cylindrical.

5. The system of claim 1, wherein a cap is affixed upon the filter that retains the filter in position relative to the third port.

6. The system of claim 1, further comprising a hose that is configured to at least indirectly link the second port to the carburetor.

7. The system of claim 1, further comprising a hose that is configured to at least indirectly link the first port to the fuel tank.

8. The system of claim 1, wherein the filter also allows at least some of the fuel vapors to proceed from the third port to the outside environment during a time at which the internal combustion engine is not operating.

9. The system of claim 1, wherein the filter can be replaced with a carbon canister.

10. The system of claim 1 wherein the coupling device is substantially T-shaped.

11. The system of claim 1 wherein the coupling device is substantially Y-shaped.

12. The system of claim 1, wherein either a section of the coupling device including the third port has a barbed locking protuberance, or the system further includes a roll-over valve.

13. An internal combustion engine assembly comprising the system of claim 1, wherein the engine assembly further includes the fuel tank and the carburetor, and wherein the carburetor is fed with fuel from the fuel tank due to gravitational force acting upon the fuel.

14. A method of providing carburetor venting performed by the engine assembly of claim 13, the method comprising:
during a first time at which an engine of the engine assembly is not running, either (a) allowing a first portion of the fuel vapors to exit the fuel tank and proceed to the outside environment via the coupling device and the filter, or (b) at least partly restricting the first portion of the fuel vapors from proceeding to the outside environment due to the filter; and
during a second time at which the engine is being operated, allowing at least some air from the outside environment to proceed into the coupling device via the filter and toward the fuel tank, whereby a vacuum within the fuel tank is reduced.

15. An internal combustion engine assembly with a system for venting fuel vapors, the internal combustion engine assembly comprising:
a fuel tank;
a structure that receives incoming air for use by an engine of the internal combustion engine assembly;
a connector assembly including a filter and a coupling device having first, second and third ports that are all connected with one another internally at a junction within the coupling device, wherein the first port is in communication with the fuel tank, the second port is in communication with the structure, and third port is in communication with an outside atmosphere indirectly by way of the filter;
wherein at least one obstruction is formed within one or both of (a) a first channel within the coupling device linking the junction with the second port and (b) a second channel at least partly linking the second port with the structure, wherein the at least one obstruction partly but not entirely obstructs a flow path through one or both of the first and second channels.

16. The internal combustion engine assembly of claim 15, wherein either (c) the system is a carburetor venting system and the structure includes a carburetor, or (d) the system is an evaporative emissions system and the structure includes a throttle associated with an electronic fuel injection system.

17. The internal combustion engine assembly of claim 15, wherein the internal combustion engine assembly is configured for use in a small off-road engine application or a non-road engine application.

18. The internal combustion engine assembly of claim 15, wherein the structure includes a throttle assembly including a throttle valve, wherein the second port is coupled at least indirectly with a purge port positioned proximate the throttle valve, and wherein the purge port is positioned in relation to the throttle valve in a manner such that the purge port is positioned relatively upstream of the throttle valve in terms of a direction of the incoming air received by the structure when the throttle valve is orientated in a position intended to cause idling of the engine.

19. The internal combustion engine of claim 15, wherein the internal combustion engine assembly includes both the first and second channels that form an overall channel leading from the junction to the structure, and wherein the at least one obstruction includes a first junction formed within the first channel proximate the second port.

20. A method of operating an internal combustion engine assembly, the method comprising:
providing a coupling device having first, second, and third ports that are in communication with one another, wherein the first port is at least indirectly coupled to a fuel tank of the engine assembly, wherein the second port is at least indirectly coupled to a throttle structure of the engine assembly, and wherein the third port is in communication with an outside atmosphere by way of a filter;
during a first time at which an engine of the engine assembly is not being operated, either (a) allowing a first portion of fuel vapors to proceed from the fuel tank to the outside environment via the coupling device and the filter, or (b) at least partly restricting the first portion of the fuel vapors from proceeding from the fuel tank to the outside environment due to the filter; and
during a second time at which the engine is being operated, either (c) allowing a second portion of fuel vapors to proceed from the fuel tank to the throttle structure via the coupling device, or (d) allowing at least some air from the outside environment to proceed into the coupling device via the filter and toward the fuel tank, whereby a vacuum within the fuel tank is reduced.

\* \* \* \* \*